(12) United States Patent
Kobayashi et al.

(10) Patent No.: US 6,275,825 B1
(45) Date of Patent: Aug. 14, 2001

(54) DATA ACCESS CONTROL APPARATUS FOR LIMITING DATA ACCESS IN ACCORDANCE WITH USER ATTRIBUTE

(75) Inventors: Yoichi Kobayashi, Yamanashi; Tomohiro Machida, Hidaka; Kunihiko Isomura, Akishima, all of (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/218,529

(22) Filed: Dec. 21, 1998

(30) Foreign Application Priority Data

Dec. 29, 1997 (JP) .................................................. 9-369065

(51) Int. Cl.⁷ .................................................. G06F 17/30
(52) U.S. Cl. .............................. 707/9; 707/103; 707/104; 707/200; 705/52; 705/54; 709/220; 709/225; 713/187; 713/200
(58) Field of Search .................................. 707/9, 104, 1, 707/6, 103, 200, 10; 709/225, 106, 220, 315; 711/100, 200; 713/201, 202, 187; 705/30, 52, 54, 80

(56) References Cited

U.S. PATENT DOCUMENTS 5,057,996 * 10/1991 Cutler et al. .......................... 709/106
5,129,083 * 7/1992 Cutler et al. .......................... 707/103

(List continued on next page.)

FOREIGN PATENT DOCUMENTS 10-326213  12/1998 (JP) .

OTHER PUBLICATIONS

Dewan, Prasun et al., "Controlling Access in Multiuser Interfaces", ACM Transactions on Computer–Human Interaction, vol. 5, No. 1, Mar. 1998, pp. 34–62.*

Kang, Sukhoon et al., "An Integrated Access Control In Heterogeneous Distributed Database Systems", IEEE Region 10 International Conference, TENCON '92, Nov. 11–13 1992, vol. 1, pp. 222–226.*

(List continued on next page.)

Primary Examiner—Hosain T. Alam
Assistant Examiner—Shahid Alam
(74) Attorney, Agent, or Firm—Frishauf, Holtz, Goodman, Langer & Chick, P.C.

(57) ABSTRACT

This invention provides a data access control apparatus arranged to automatically set access right information limiting data access, in accordance with a user attribute when a user accesses a database. In setting, for a plurality of users, access right information corresponding to each user, the load on an operator can be reduced, and access right information setting errors can be prevented. An automatic setting unit reads out information from a login management information file and an employee information file on the basis of definition information of a definition files to automatically generate a user access right management file which stores a login ID, an item access right, and a record access right group code for each user. When a login ID is input in accessing the employee information file, a setting controller refers to the management file to determine a user group to which the user belongs and an access enabled/disabled state of the data on the basis of the access right made to correspond to this user group.

24 Claims, 21 Drawing Sheets

U.S. PATENT DOCUMENTS

| | | | |
|---|---|---|---|
| 5,265,221 | | 11/1993 | Miller . |
| 5,497,418 | * | 3/1996 | Kudelski ............................ 380/242 |
| 5,915,019 | * | 6/1999 | Ginter et al ........................... 705/54 |
| 5,944,794 | * | 8/1999 | Okamoto et al. .................... 709/225 |
| 5,991,751 | * | 11/1999 | Rivette et al. ........................... 707/1 |
| 5,999,766 | * | 12/1999 | Hisatomi et al. ...................... 399/80 |
| 6,119,132 | * | 9/2000 | Kuwano .............................. 707/205 |
| 6,178,422 | * | 1/2001 | Tada et al. ............................... 707/9 |

OTHER PUBLICATIONS

Oki, Y. et al., "A Design Method for Data Integrity in Object–Oriented Database Systems", Proceedings of IEEE Singapore International Conference on Networks, Jul. 3–7 1995, pp. 204–209.*

Chor, Leong Peng et al., "Group Accesses With Smart Card And Threshold Scheme", Proceedings of the IEEE Region 10 Conference, TENCON 99, Sep. 15–17 1999, vol. 1, pp. 415–418.*

S. P. Deng et al, "A Dynamic Access Control Model for Object–Oriented System", *Proceedings of the International Carnahan Conference on Security Technology, New York, US, IEEE, Oct. 13–15, 1993*, pp. 159–163.

S. H. Von Solms et al, "The management of computer security profiles using a role–oriented approach", *Computers & Security*, vol. 13, No. 8, 1994, pp. 673–680.

Database WPI, Week 9908, Derwent Publications Ltd., London, GB; AN 1999–091335, XP002129060 & JP 10 326213 A (Casio Computer Co. Ltd.), Dec. 8 1998.

* cited by examiner

FIG.2

| | |
|---|---|
| DATABASE(EMPLOYEE INFORMATION FILE) | /DB |
| RELATIONAL DATABASE MANAGEMENT SYSTEM | /RDBMS |
| APPLICATION PROGRAM | /AP |
| ACCESS RIGHT SETTING TABLE FORM | /FM |
| ITEM ACCESS RIGHT AUTOMATIC GENERATION DEFINITION FILE | /FGF |
| RECORD ACCESS RIGHT AUTOMATIC GENERATION DEFINITION FILE | /RGF |
| LOGIN MANAGEMENT INFORMATION FILE | /LMF |
| LOGIN MANAGEMENT INFORMATION LINKING DEFINITION FILE | /LLF |
| USER ACCESS RIGHT MANAGEMENT FILE | /UNF |
| ITEM ACCESS RIGHT INFORMATION FILE | /FMF |
| RECORD ACCESS RIGHT MANAGEMENT FILE | /RMF |
| OPTIMIZATION ACCESS RIGHT MANAGEMENT FILE | /OPF |
| USER DB ACCESS RIGHT FILE | /UAF |

1. ITEM ACCESS RIGHT AUTOMATIC GENERATION DEFINITION FILE

· STRUCTURE

FIG. 3A1
```
Field=ITEM NAME
Code1=VALUE 1
Code2=VALUE 2
Code3=VALUE 3
     ↓
CodeN=VALUE N
```

· EXAMPLE OF ITEM ACCESS RIGHT AUTOMATIC GENERATION DEFINITION FILE

FIG. 3A2
```
Field=POST
A=DEPARTMENT
   MANAGER
B=SECTION MANAGER
C=PERSONNEL STAFF
D=REGULAR EMPLOYEE
```

3. LOGIN MANAGEMENT INFORMATION LINKING DEFINITION FILE

· STRUCTURE

FIG. 3C1
```
Login=ITEM NAME
File=FILE NAME;
   DB NAME
Field=ITEM NAME
```

· EXAMPLE OF LOGIN MANAGEMENT INFORMATION LINKING DEFINITION FILE

FIG. 3C2
```
Login=USER NO.
File=EMPLOYEE
   INFORMATION;
   PERSONNEL
Field=EMPLOYEE NO.
```

2. RECORD ACCESS RIGHT AUTOMATIC GENERATION DEFINITION FILE

· STRUCTURE

FIG. 3B1
```
Field=ITEM NAME
Code1=VALUE 1
Code2=VALUE 2
Code3=VALUE 3
     ↓
CodeN=VALUE N
```

· EXAMPLE OF RECORD ACCESS RIGHT AUTOMATIC GENERATION DEFINITION FILE

FIG. 3B2
```
Field=DEPARTMENT
1=PERSONNEL
   DEPARTMENT
2=GENERAL AFFAIRS
   DEPARTMENT
3=SALES DEPARTMENT
```

FIG.4

| LOGIN ID | USER NO. | PASSWORD | HOME DIRECTORY |
|---|---|---|---|
| tuzaki | 10265 | ******** | / usr / gyoumu / jinji |
| inoue | 12098 | ******** | / usr / gyoumu / jinji |
| takeuchi | 15909 | ******** | / usr / gyoumu / jinji |
| wada | 14288 | ******** | / usr / gyoumu / jinji |
| sakaki | 16229 | ******** | / usr / gyoumu / jinji |
| fukasawa | 17882 | ******** | / usr / gyoumu / jinji |
| kanayama | 17899 | ******** | / usr / gyoumu / jinji |
| tooyama | 18223 | ******** | / usr / gyoumu / jinji |
| hisada | 18765 | ******** | / usr / gyoumu / jinji |
| tukada | 20112 | ******** | / usr / gyoumu / jinji |
| yamamuro | 24563 | ******** | / usr / gyoumu / jinji |
| tunoda | 29099 | ******** | / usr / gyoumu / jinji |
| tanaka | 11672 | ******** | / usr / gyoumu / soumu |
| murayama | 13298 | ******** | / usr / gyoumu / soumu |
| yamasaki | 15002 | ******** | / usr / gyoumu / soumu |
| satoh | 16334 | ******** | / usr / gyoumu / soumu |
| suzuki | 16782 | ******** | / usr / gyoumu / soumu |
| touchi | 17537 | ******** | / usr / gyoumu / soumu |
| ↓ | | | |
| kubota | 10207 | ******** | / usr / gyoumu / eigyou |
| maeda | 11087 | ******** | / usr / gyoumu / eigyou |
| souda | 12983 | ******** | / usr / gyoumu / eigyou |
| koyama | 14667 | ******** | / usr / gyoumu / eigyou |
| siota | 15222 | ******** | / usr / gyoumu / eigyou |
| komori | 15879 | ******** | / usr / gyoumu / eigyou |
| yamamoto | 16331 | ******** | / usr / gyoumu / eigyou |
| hirata | 16362 | ******** | / usr / gyoumu / eigyou |
| ↓ | | | |

FIG.5

EMPLOYEE INFORMATION FILE

| EMPLOYEE NO. | NAME | OFFICE LOCATION | DEPARTMENT | SECTION | POST | QUALIFI-CATION | EFFICIENCY RATING | SALARY | AGE | SEX | PHYSICAL CONDITION | PUBLIC QUALIFICATION | HOBBY | REWARD AND PUNISH-MENT | APPLICATION FOR PERSONNEL CHANGES |
|---|---|---|---|---|---|---|---|---|---|---|---|---|---|---|---|
| 10265 | tuzaki ○○ | TOKYO | PERSONNEL | PERSONNEL | DEPARTMENT MANAGER | S1 | A | 999,999 | 99 | MALE | GOOD | NONE | MUSIC | NONE | NONE |
| 12098 | inoue ○○ | TOKYO | PERSONNEL | PERSONNEL SECTION 1 | SECTION MANAGER | S2 | B | 999,999 | 99 | MALE | GOOD | NONE | SPORTS | NONE | NONE |
| 15909 | takeuchi ○○ | OSAKA | PERSONNEL | PERSONNEL SECTION 2 | SECTION MANAGER | S2 | A | 999,999 | 99 | MALE | GOOD | NONE | READING | NONE | NONE |
| 14288 | wada ○○ | TOKYO | PERSONNEL | PERSONNEL SECTION 1 | REGULAR EMPLOYEE | W1 | A | 999,999 | 99 | MALE | GOOD | SMALL AND MEDIUM ENTERPRISES DIAGNOSTICIAN | MUSIC | NONE | NONE |
| 16229 | sakamoto ○○ | OSAKA | PERSONNEL | PERSONNEL SECTION 2 | REGULAR EMPLOYEE | W2 | C | 999,999 | 99 | MALE | GOOD | NONE | SPORTS | NONE | NONE |
| 17882 | kanayama ○○ | OSAKA | PERSONNEL | PERSONNEL SECTION 2 | REGULAR EMPLOYEE | W2 | B | 999,999 | 99 | MALE | GOOD | | | | |
| 17899 | tooyama ○○ | TOKYO | GENERAL AFFAIRS | | | | | | | | | | | | |
| | | TOKYO | | | | | | | | | | | | | |

FIG.6A

| LOGIN ID | ITEM ACCESS RIGHT GROUP CODE | RECORD ACCESS RIGHT GROUP CODE |
|---|---|---|
| tuzaki | A | 1 |
| inoue | B | 1 |
| takeuchi | B | 1 |
| wada | C | 1 |
| sakaki | C | 1 |
| fukasawa | C | 1 |
| kanayama | C | 1 |
| tooyama | C | 1 |
| hisada | C | 1 |
| tukada | C | 1 |
| yamamuro | C | 1 |
| tunoda | D | 1 |
| tanaka | A | 2 |
| murayama | B | 2 |
| yamasaki | D | 2 |
| satoh | D | 2 |
| suzuki | D | 2 |
| touchi | D | 2 |
| ↓ | | |
| kubota | A | 3 |
| maeda | B | 3 |
| souda | B | 3 |
| koyama | B | 3 |
| siota | D | 3 |
| komori | D | 3 |
| yamamoto | D | 3 |
| hirata | D | 3 |
| ↓ | | |

• FOR ONLY ITEM ACCESS RIGHT GROUP

FIG.6B

| LOGIN ID | ITEM ACCESS RIGHT GROUP CODE |
|---|---|
| tuzaki | A |
| inoue | B |
| takeuchi | B |
| touchi | D |
| ↓ | |

• FOR ONLY RECORD ACCESS RIGHT GROUP

FIG.6C

| LOGIN ID | RECORD ACCESS RIGHT GROUP CODE |
|---|---|
| tuzaki | 1 |
| inoue | 1 |
| takeuchi | 1 |
| touchi | 1 |
| ↓ | |

FIG.16

| FILE | EMPLOYEE INFORMATION | | | |
|---|---|---|---|---|
| GROUP | A<br>DEPARTMENT MANAGER | B<br>SECTION MANAGER | C<br>PERSONNEL STAFF | D<br>REGULAR EMPLOYEE |
| 1 PERSONNEL DEPARTMENT | POST<br>< DIRECTOR | OFFICE LOCATION<br>= | OFFICE LOCATION<br>= | |
| | | | EMPLOYEE NO.<br>≠ | |
| 2 GENERAL AFFAIRS DEPARTMENT | DEPARTMENT<br>= | SECTION<br>= | | SECTION<br>= |
| | | | | POST<br>≤ |
| 3 SALES DEPARTMENT | DEPARTMENT<br>= | SECTION<br>= | | SECTION<br>= |
| | | | | POST<br>≤ |

FIG.17A

ITEM ACCESS RIGHT MANAGEMENT FILE

```
FILE=EMPLOYEE INFORMATION
A:
B:EMPLOYEE NO.; NAME; OFFICE LOCATION; DEPARTMENT;
  SECTION; POST; QUALIFICATION; EFFICIENCY RATING; SALARY;
  AGE; SEX; PHYSICAL CONDITION; PUBLIC QUALIFICATION; HOBBY
C:
D:EMPLOYEE NO.; NAME; OFFICE LOCATION; DEPARTMENT;
  SECTION; POST; SEX; PUBLIC QUALIFICATION; HOBBY
FILE=   ·
          ·
          ·
```

FIG.17B

RECORD ACCESS RIGHT MANAGEMENT FILE

```
FILE=EMPLOYEE INFORMATION
A1:POST; <DIRECTOR
B1:OFFICE LOCATION;=
C1:OFFICE LOCATION;=; EMPLOYEE NO.;≠
D1:
A2:DEPARTMENT;=
B2:SECTION;=
C2:
D2:DEPARTMENT;=; POST;≦
A3:DEPARTMENT;=
B3:SECTION;=
C3:
D3:DEPARTMENT;=; POST;≦
FILE=   ·
          ·
          ·
```

FIG.18A

USER ACCESS RIGHT MANAGEMENT FILE tsuzaki=A1
inoue=B1
takeuchi=B1
tsukada=C1
uchiyama= C1
.
.
tanaka=A2
murayama=B2
yamazaki=D1
.

FIG.18B

OPTIMIZATION ACCESS RIGHT MANAGEMENT FILE group=A-1 : A1
EMPLOYEE INFORMATION : POST;<DIRECTOR
EMPLOYEE XX : aaa;=
.

group=A-2 : A2;A3
EMPLOYEE INFOEMATION : DEPARTMENT;=
EMPLOYEE XX : bbb;=
.

group=B-1 : B1
EMPLOYEE INFOEMATION : OFFICE LOCATION;=
EMPLOYEE XX : ccc;=
.

group=B-2 : B2;B3
EMPLOYEE INFOEMATION : DEPARTMENT;=
EMPLOYEE XX : ddd;=
.

group=C-1 : C1
EMPLOYEE INFOEMATION : OFFICE LOCATION;=
;EMPLOYEE NO.;≠
EMPLOYEE XX : ccc;=;EMPLOYEE NO.;≠
.

group=C-2 : C2;C3
EMPLOYEE INFOEMATION :
EMPLOYEE XX :
.

group=D-1 : D1
EMPLOYEE INFOEMATION :
EMPLOYEE XX :
.

group=D-2 : D2;D3
EMPLOYEE INFOEMATION : SECTION;=; POST≦
EMPLOYEE XX : ddd;=;aaa;≦
.

FIG.18C

USER DB ACCESS RIGHT FILE tsuzaki=A1:A-1
inoue=B1:B-1
takeuchi=B1:B-1
tsukada=C1:C-1
uchiyama= C1:C-1
.
.
tanaka=A2:A-2
murayama=B2:B-2
tamura=B3:B-2
yamazaki=D2:D-2
kitano=D3:D-2
.

FIG.19

| DEPARTMENT | SECTION | POST | QUALIFI-CATION | EFFICIENCY RATING | SALARY | AGE | SEX | PHYSICAL CONDITION | PUBLIC QUALIFICATION | HOBBY | REWARD AND PUNISH-MENT | APPLICATION FOR PERSONNEL CHANGES |
|---|---|---|---|---|---|---|---|---|---|---|---|---|
| PERSONNEL | PERSONNEL | DEPARTMENT MANAGER | **** | ** | **** | ** | MALE | * | NONE | MUSIC | *** | **** |
| PERSONNEL | PERSONNEL SECTION 1 | SECTION MANAGER | **** | ** | **** | ** | MALE | * | NONE | SPORTS | *** | **** |
| PERSONNEL | PERSONNEL SECTION 2 | SECTION MANAGER | **** | ** | **** | ** | MALE | * | NONE | READING | *** | **** |
| PERSONNEL | PERSONNEL SECTION 1 | PERSONNEL STAFF | **** | ** | **** | ** | MALE | * | SMALL AND MEDIUM ENTERPRISES DIAGNOSTICIAN | MUSIC | *** | **** |
| PERSONNEL | PERSONNEL SECTION 2 | PERSONNEL STAFF | **** | ** | **** | ** | MALE | * | NONE | SPORTS | *** | **** |
| PERSONNEL | PERSONNEL SECTION 2 | PERSONNEL STAFF | **** | ** | **** | ** | FEMALE | * | NONE | READING | *** | **** |
| GENERAL AFFAIRS | GENERAL AFFAIRS | DEPARTMENT MANAGER | **** | ** | **** | ** | MALE | * | NONE | SPORTS | *** | **** |
| GENERAL AFFAIRS | GENERAL AFFAIRS SECTION 1 | SECTION MANAGER | **** | ** | **** | ** | MALE | * | NONE | READING | *** | **** |
| GENERAL AFFAIRS | GENERAL AFFAIRS SECTION 2 | SECTION MANAGER | **** | ** | **** | ** | MALE | * | LICENSED TAX ACCOUNTANT | MUSIC | *** | **** |
| GENERAL AFFAIRS | GENERAL AFFAIRS SECTION 3 | SECTION MANAGER | **** | ** | **** | ** | MALE | * | NONE | SPORTS | *** | **** |
| GENERAL AFFAIRS | GENERAL AFFAIRS SECTION 4 | SECTION MANAGER | **** | ** | **** | ** | MALE | * | NONE | SPORTS | *** | **** |
| GENERAL AFFAIRS | GENERAL AFFAIRS SECTION 1 | REGULAR EMPLOYEE | **** | ** | **** | ** | MALE | * | SECOND-CLASS ENGLISH CERTIFICATE | READING | *** | **** |
| GENERAL AFFAIRS | GENERAL AFFAIRS SECTION 2 | REGULAR EMPLOYEE | **** | ** | **** | ** | FEMALE | * | NONE | MUSIC | *** | **** |
| GENERAL AFFAIRS | GENERAL AFFAIRS SECTION 3 | REGULAR EMPLOYEE | **** | ** | **** | ** | MALE | * | NONE | SPORTS | *** | **** |
| GENERAL AFFAIRS | GENERAL AFFAIRS SECTION 1 | REGULAR EMPLOYEE | **** | ** | **** | ** | MALE | * | SYSTEM SUPERVISOR | READING | *** | **** |
| GENERAL AFFAIRS | GENERAL AFFAIRS SECTION 2 | REGULAR EMPLOYEE | **** | ** | **** | ** | MALE | * | NONE | SPORTS | *** | **** |
| GENERAL AFFAIRS | GENERAL AFFAIRS SECTION 3 | REGULAR EMPLOYEE | **** | ** | **** | ** | MALE | * | NONE | READING | *** | **** |
| GENERAL AFFAIRS | GENERAL AFFAIRS SECTION 3 | REGULAR EMPLOYEE | **** | ** | **** | ** | MALE | * | THIRD-CLASS ENGLISH CERTIFICATE | MUSIC | *** | **** |
| GENERAL AFFAIRS | GENERAL AFFAIRS SECTION 4 | REGULAR EMPLOYEE | **** | ** | **** | ** | FEMALE | * | NONE | SPORTS | *** | **** |
| GENERAL AFFAIRS | GENERAL AFFAIRS SECTION 4 | REGULAR EMPLOYEE | **** | ** | **** | ** | FEMALE | * | NONE | SPORTS | *** | **** |
| SALES | SALES | DEPARTMENT MANAGER | **** | ** | **** | ** | MALE | * | NONE | READING | *** | **** |
| SALES | SALES SECTION 1 | SECTION MANAGER | **** | ** | **** | ** | MALE | * | SECOND-CLASS BOOKKEEPING CERTIFICATE | MUSIC | *** | **** |
| SALES | SALES SECTION 2 | SECTION MANAGER | **** | ** | **** | ** | MALE | * | NONE | SPORTS | *** | **** |
| SALES | SALES SECTION 3 | SECTION MANAGER | **** | ** | **** | ** | MALE | * | NONE | READING | *** | **** |
| SALES | SALES SECTION 4 | SECTION MANAGER | **** | ** | **** | ** | MALE | * | NONE | SPORTS | *** | **** |
| SALES | SALES SECTION 5 | SECTION MANAGER | **** | ** | **** | ** | MALE | * | NONE | READING | *** | **** |
| SALES | SALES SECTION 6 | SECTION MANAGER | **** | ** | **** | ** | MALE | * | NONE | MUSIC | *** | **** |
| SALES | SALES SECTION 1 | REGULAR EMPLOYEE | **** | ** | **** | ** | MALE | * | NONE | SPORTS | *** | **** |
| SALES | SALES SECTION 1 | REGULAR EMPLOYEE | **** | ** | **** | ** | MALE | * | DANGEROUS ARTICLE AGENT | SPORTS | *** | **** |
| SALES | SALES SECTION 2 | REGULAR EMPLOYEE | **** | ** | **** | ** | MALE | * | NONE | READING | *** | **** |
| SALES | SALES SECTION 3 | REGULAR EMPLOYEE | **** | ** | **** | ** | MALE | * | NONE | MUSIC | *** | **** |
| SALES | SALES SECTION 4 | REGULAR EMPLOYEE | **** | ** | **** | ** | MALE | * | NONE | SPORTS | *** | **** |
| SALES | SALES SECTION 4 | REGULAR EMPLOYEE | **** | ** | **** | ** | MALE | * | NONE | READING | *** | **** |
| SALES | SALES SECTION 5 | REGULAR EMPLOYEE | **** | ** | **** | ** | MALE | * | THIRD-CLASS BOOKKEEPING CERTIFICATE | SPORTS | *** | **** |
| SALES | SALES SECTION 6 | REGULAR EMPLOYEE | **** | ** | **** | ** | MALE | * | NONE | READING | *** | **** |
| SALES | SALES SECTION 1 | REGULAR EMPLOYEE | **** | ** | **** | ** | MALE | * | NONE | MUSIC | *** | **** |
| SALES | SALES SECTION 1 | REGULAR EMPLOYEE | **** | ** | **** | ** | MALE | * | FIRST-CLASS ENGLISH CERTIFICATE | SPORTS | *** | **** |
| SALES | SALES SECTION 1 | REGULAR EMPLOYEE | **** | ** | **** | ** | MALE | * | NONE | SPORTS | *** | **** |
| SALES | SALES SECTION 1 | REGULAR EMPLOYEE | **** | ** | **** | ** | MALE | * | NONE | READING | *** | **** |
| SALES | SALES SECTION 1 | REGULAR EMPLOYEE | **** | ** | **** | ** | MALE | * | NONE | SPORTS | *** | **** |
| SALES | SALES SECTION 3 | REGULAR EMPLOYEE | **** | ** | **** | ** |  | * | NONE | READING | *** | **** |

FIG.20

| DEPARTMENT | SECTION | POST | QUALIFI-CATION | EFFICIENCY RATING | SALARY | AGE | SEX | PHYSICAL CONDITION | PUBLIC QUALIFICATION | HOBBY | REWARD AND PUNISH-MENT | APPLICATION FOR PERSONNEL CHANGES |
|---|---|---|---|---|---|---|---|---|---|---|---|---|
| GENERAL AFFAIRS | GENERAL AFFAIRS | DEPARTMENT MANAGER | S1 | B | 999,999 | 99 | MALE | GOOD | NONE | SPORTS | NONE | NONE |
| GENERAL AFFAIRS | GENERAL AFFAIRS SECTION 1 | SECTION MANAGER | S2 | A | 999,999 | 99 | MALE | GOOD | NONE | READING | NONE | NONE |
| GENERAL AFFAIRS | GENERAL AFFAIRS SECTION 2 | SECTION MANAGER | S2 | B | 999,999 | 99 | MALE | GOOD | LICENSED TAX ACCOUNTANT | MUSIC | NONE | NONE |
| GENERAL AFFAIRS | GENERAL AFFAIRS SECTION 3 | SECTION MANAGER | S2 | C | 999,999 | 99 | MALE | GOOD | NONE | SPORTS | NONE | NONE |
| GENERAL AFFAIRS | GENERAL AFFAIRS SECTION 4 | SECTION MANAGER | S2 | B | 999,999 | 99 | MALE | GOOD | NONE | SPORTS | NONE | NONE |
| GENERAL AFFAIRS | GENERAL AFFAIRS SECTION 1 | REGULAR EMPLOYEE | W1 | A | 999,999 | 99 | MALE | GOOD | SECOND-CLASS ENGLISH CERTIFICATE | READING | NONE | NONE |
| GENERAL AFFAIRS | GENERAL AFFAIRS SECTION 2 | REGULAR EMPLOYEE | W1 | B | 999,999 | 99 | FEMALE | GOOD | NONE | MUSIC | NONE | NONE |
| GENERAL AFFAIRS | GENERAL AFFAIRS SECTION 3 | REGULAR EMPLOYEE | W1 | A | 999,999 | 99 | MALE | GOOD | NONE | SPORTS | NONE | NONE |
| GENERAL AFFAIRS | GENERAL AFFAIRS SECTION 1 | REGULAR EMPLOYEE | W2 | A | 999,999 | 99 | MALE | GOOD | SYSTEM SUPERVISOR | READING | NONE | NONE |
| GENERAL AFFAIRS | GENERAL AFFAIRS SECTION 2 | REGULAR EMPLOYEE | W2 | C | 999,999 | 99 | MALE | GOOD | NONE | SPORTS | NONE | NONE |
| GENERAL AFFAIRS | GENERAL AFFAIRS SECTION 3 | REGULAR EMPLOYEE | W2 | B | 999,999 | 99 | MALE | GOOD | NONE | READING | NONE | NONE |
| GENERAL AFFAIRS | GENERAL AFFAIRS SECTION 3 | REGULAR EMPLOYEE | W2 | B | 999,999 | 99 | MALE | GOOD | THIRD-CLASS ENGLISH CERTIFICATE | MUSIC | NONE | NONE |
| GENERAL AFFAIRS | GENERAL AFFAIRS SECTION 4 | REGULAR EMPLOYEE | W2 | A | 999,999 | 99 | FEMALE | GOOD | NONE | SPORTS | NONE | NONE |
| GENERAL AFFAIRS | GENERAL AFFAIRS SECTION 4 | REGULAR EMPLOYEE | W2 | B | 999,999 | 99 | FEMALE | GOOD | NONE | SPORTS | NONE | NONE |

FIG.21

| DEPARTMENT | SECTION | POST | QUALIFI-CATION | EFFICIENCY RATING | SALARY | AGE | SEX | PHYSICAL CONDITION | PUBLIC QUALIFICATION | HOBBY | REWARD AND PUNISH-MENT | APPLICATION FOR PERSONNEL CHANGES |
|---|---|---|---|---|---|---|---|---|---|---|---|---|
| GENERAL AFFAIRS | GENERAL AFFAIRS SECTION 1 | REGULAR EMPLOYEE | **** | ** | **** | ** | MALE | ** | NONE | SPORTS | ** | *** |
| GENERAL AFFAIRS | GENERAL AFFAIRS SECTION 1 | REGULAR EMPLOYEE | **** | ** | **** | ** | MALE | ** | NONE | READING | ** | *** |
| GENERAL AFFAIRS | GENERAL AFFAIRS SECTION 1 | REGULAR EMPLOYEE | **** | ** | **** | ** | MALE | ** | LICENSED TAX ACCOUNTANT | MUSIC | ** | *** |
| GENERAL AFFAIRS | GENERAL AFFAIRS SECTION 1 | REGULAR EMPLOYEE | **** | ** | **** | ** | MALE | ** | NONE | SPORTS | ** | *** |
| GENERAL AFFAIRS | GENERAL AFFAIRS SECTION 1 | REGULAR EMPLOYEE | **** | ** | **** | ** | MALE | ** | NONE | SPORTS | ** | *** |
| GENERAL AFFAIRS | GENERAL AFFAIRS SECTION 1 | REGULAR EMPLOYEE | **** | ** | **** | ** | MALE | ** | SECOND-CLASS ENGLISH CERTIFICATE | READING | ** | *** |
| GENERAL AFFAIRS | GENERAL AFFAIRS SECTION 1 | REGULAR EMPLOYEE | **** | ** | **** | ** | MALE | ** | NONE | MUSIC | ** | *** |

US 6,275,825 B1

DATA ACCESS CONTROL APPARATUS FOR LIMITING DATA ACCESS IN ACCORDANCE WITH USER ATTRIBUTE

BACKGROUND OF THE INVENTION

The present invention relates to a data access control apparatus for limiting data access in accordance with user attributes.

In a conventional data access control apparatus for accessing a database in accordance with a relational database management system (RDBMS), access right information is set using a database language "SQL", and the database access is controlled in accordance with the RDBMS functions. As another method, the access right information is managed by an upper application layer to control access to the database.

In setting or changing an access right using the database language "SQL", descriptions based on the SQL are required to request the data item name, file name, and retrieval condition corresponding to "SE LECT", "FROM", and "WHERE" in the data access SQL statement (SELECT statement). The more the database inquiry conditions are complicated, the larger the work amount becomes. Sophisticated database knowledge and SQL knowledge are required. It is very difficult for a regular operator to set/change the access right using the SQL. At present, the regular operator requests a database manager to set/change the access right.

In the method of managing the access right information by the upper application layer, complicated logic must be installed in an application itself. It is very difficult for even a specialist having 5 advanced knowledge to set/change the access right information. When the database is accessed using another tool, security of the database may be impaired. This method is not suitable for an open environment in which a variety of software applications are present.

The present applicant has proposed a technique (Japanese Patent Application No. 9-149913 entitled "Data Access Control Apparatus and its Program Recording Medium") which eliminates descriptions based on settings using the database language in setting an access right in accordance with a user attribute to allow a regular operator having no special knowledge to easily set or change an access right, and which does not describe an access right in an application itself to maintain security in an open environment by access control upon analyzing access right information individually managed.

BRIEF SUMMARY OF THE INVENTION

It is an object of the present invention to provide a data access control apparatus which can reduce an operator's load and prevent setting errors of access right information in setting, in units of users, access right information corresponding to each user.

The feature of the present invention is as follows.

A data access control apparatus for limiting access to data on the basis of a user attribute in accessing the data in a database having a plurality of records each constituted by a plurality of data items comprises: user information storage means for storing at least a data item representing identification information unique to a user and a data item representing a user attribute in correspondence with a plurality of users; definition means for defining a user group corresponding to contents of the data item representing the user attribute; generation means for generating user group information representing that a user group is made to correspond to each user; access right information storage means for storing access right information in correspondence with the user group, the access right information representing whether access to the data in the database is allowed; and access control means for, when an arbitrary user is designated in accessing the database, determining a user group, to which the arbitrary user belongs, with reference to the user group information generated by the generation means, and determining on the basis of the access right information made to correspond to the determined user group whether access to the data in the database is allowed.

According to the present invention, in setting, in units of users, access right information corresponding to each user, the operator's load can be reduced, and setting errors of the access right information can be prevented. A regular operator having no special knowledge can automatically set access right information without performing settings. Therefore, security of the database can be maintained even in an open environment.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a view showing name files in a memory unit 3;

FIGS. 3A1 and 3A2 are views showing the data structure of an item access right automatic generation definition file FGF and its example, FIGS. 3B1 and 3B2 are views showing the data structure of a record access right automatic generation definition file RGF and its example, and FIGS. 3C1 and 3C2 are views showing the data structure of a login management information linking definition file LLF and its example;

FIG. 4 is a view showing the structure of a login management information file LMF;

FIG. 5 is a view showing the structure of an employee information file DB;

FIG. 6A is a view showing the structure of a user access right management file UMF of an embodiment, and FIGS. 6B and 6C are views showing application examples as the modifications of the user access right management file UMF;

FIG. 16 is a view showing an example in which a record access right is set in a table form;.

FIG. 17A is a view showing the data structure of an item access right management file FMF, and FIG. 17B is a view showing the data structure of a record access right management file RMF;

FIGS. 18A through 18C are views showing the structures of the user access right management file UMF, an optimization access right management file OPF, and a user DB access right file UAF, respectively;

FIG. 19 is a view showing the contents retrieved, displayed, and output from an employee information file in accordance with its set contents when only an item access right is set for a regular employee;

FIG. 20 is a view showing the contents retrieved, displayed, and output from an employee information file using a user as the general affairs department manager is given as a condition; and FIG. 21 is a view showing the contents retrieved, displayed, and output from an employee information file when a regular employee belonging to the general affairs department is given as a condition.

DETAILED DESCRIPTION OF THE INVENTION

An embodiment of the present invention will be described with reference to FIGS. 1 through 21.

Figure 1:
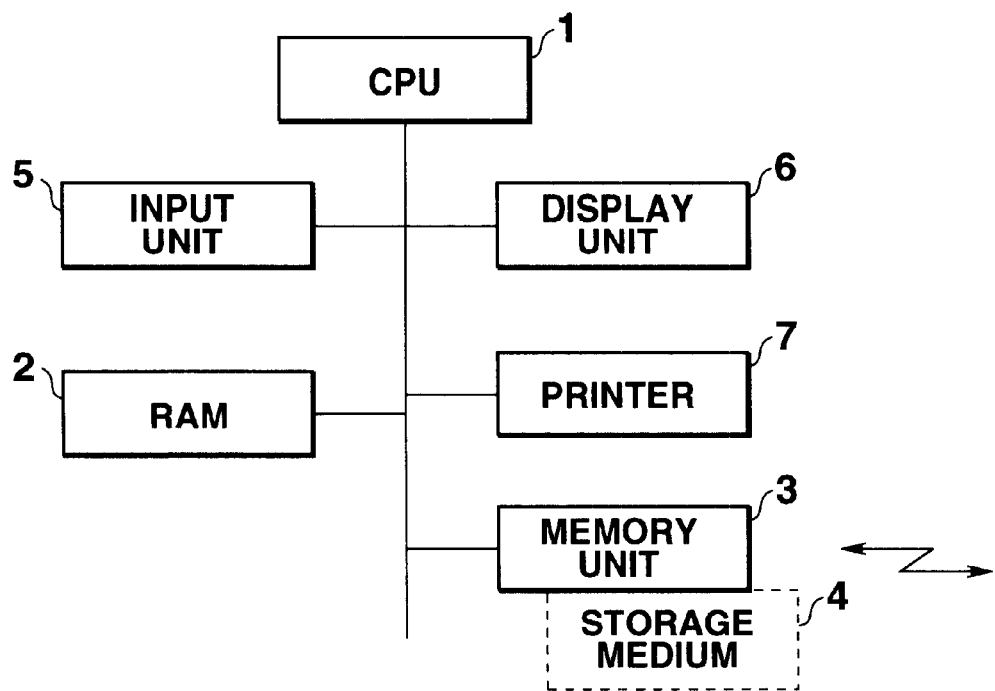
FIG. 1 is a block diagram showing the overall arrangement of a data access control apparatus.

FIG. 1 is a block diagram showing the overall arrangement of a data access control apparatus.

A CPU 1 is a central processing unit for controlling the overall operation of the data access control apparatus in accordance with a variety of programs loaded in a RAM 2. A memory unit 3 has a storage medium 4 which stores an operating system, a variety of application programs, a database, character font data, and the like in advance, and a drive system for the storage medium 4. The storage medium .4 may be a fixed or detachable medium and can be constituted by a magnetic or optical storage medium (e.g., a floppy disk, hard disk, optical disk, or RAM card), or a semiconductor memory. The programs and data in the storage medium 4 can be loaded in the RAM 2 under the control of the CPU 1, as needed. The CPU 1 receives a program and data transmitted from another device through a communication line or channel and stores them in the storage medium 4, or uses a program or data stored in a storage medium in another device via a communication line or channel.

The CPU 1 is connected via a bus line to an input unit 5, a display unit 6, and a printer 7, all of which serve as input/output peripheral devices. The CPU 1 controls these devices in accordance with an input/output program.

The input unit 5 comprises a keyboard for inputting character string data and various commands, or a pointing device such as a mouse. The display unit 6 comprises a full-color display liquid crystal display unit, CRT display unit, or plasma display unit. The printer 7 is a full-color printer such as a non-impact printer (e.g., a thermal transfer or ink-jet printer) or an impact printer.

FIG. 2 shows the main contents of the memory unit 3. A database DB is, for example, a relational office processing database which stores information necessary for business operations of enterprises. This database contains an employee information file, a personnel book file, a salesperson sales management file, and the like. The database DB is exemplified as the one containing an employee information file. The employee information file DB is accessed by a relational database management system RDBMS. More specifically, when a user requests data matching a predetermined condition, an application program AP receives this retrieval request and generates a SQL statement in accordance with this request. The program AP sends the SQL statement to the relational database management system RDBMS. Upon reception of the SQL statement, the relational database management system RDBMS analyzes this SQL statement, accesses the employee information file DB, and transfers the retrieved data to the application program AP. An access right setting table form FM represents table form information to be displayed and output in setting/changing an access right of the employee information file DB in accordance with a user attribute in units of user groups. A regular business operator sets/changes an access right in correspondence with a user group in this table. As files for setting/changing the access right of the employee information file DB in units of user groups, the memory unit 3 stores an item access right automatic generation definition file FGF, a record access right automatic generation definition file RGF, a login management information file LMF, a login management information linking definition file LLF, a user access right management file UMF, an item access right management file FMF, a record access right management file RMF, an optimization access right management file OPF, and a user DB access right file UAF.

The item access right automatic generation definition file FGF defines as an item access right group information for classifying users in accordance with a user attribute such as a post in an enterprise. FIGS. 3A1 and 3A2 are views for explaining the item access right automatic generation definition file FGF, in which FIG. 3A1 shows its data structure, and FIG. 3A2 shows its example. In this case, in order to classify the users into groups in accordance with the contents of data items represented by an item name "Field=post" of the employee information file (DB) (see FIG. 5), "department manager", "section manager", "personnel department manager", "regular employee", are defined in correspondence with group codes A, B, C, D, . . . . The record access right automatic generation definition file RGF defines as a record access right group information for classifying the users into groups in accordance with a user attribute, e.g., the enterprise departments to which the users belong. FIGS. 3B1 and 3B2 are views for explaining the record access right automatic generation definition file RGF, in which FIG. 3B1 shows its data structure, and FIG. 3B2 shows its example. In this case, in order to classify the users into groups in accordance with the contents of data items represented by an item name "Field=department" of the employee information file DB, "personnel department", "general affairs department" "sales department", . . . are defined in correspondence with group codes 1, 2, 3, . . . . The login management information linking definition file LLF links the employee information file (DB) with the login management information file LMF (to be described later). FIGS. 3C1 and 3C2 are views for explaining the login management information linking definition file LLF, in which FIG. 3C1 shows its data structure and FIG. 3C2 shows its example. In this case, "Login=item name" represents the item name "user No." of the login management information file LMF (see FIG. 4), and "File" defines the database name "personnel" and the file name "employee information". "Field" also defines the item name "employee No." of the employee information file (DB). This allows to retrieve the item "employee No." of the employee information file (DB) using the item "user No." of the login management information file LMF as a retrieval key. As shown in FIG. 4, the login management information file LMF defines "login ID", "user No.", "password", "home directory", and the like for each user. A login ID and a password are input in file access. Note that the home directory is personal information. As shown in FIG. 5, one record of the employee information file (DB) has items of "employee No.", "name", "office location", "department", "section", "post", "qualification", "efficiency rating", "salary", . . ., "application for personnel changes".

Figure 7:
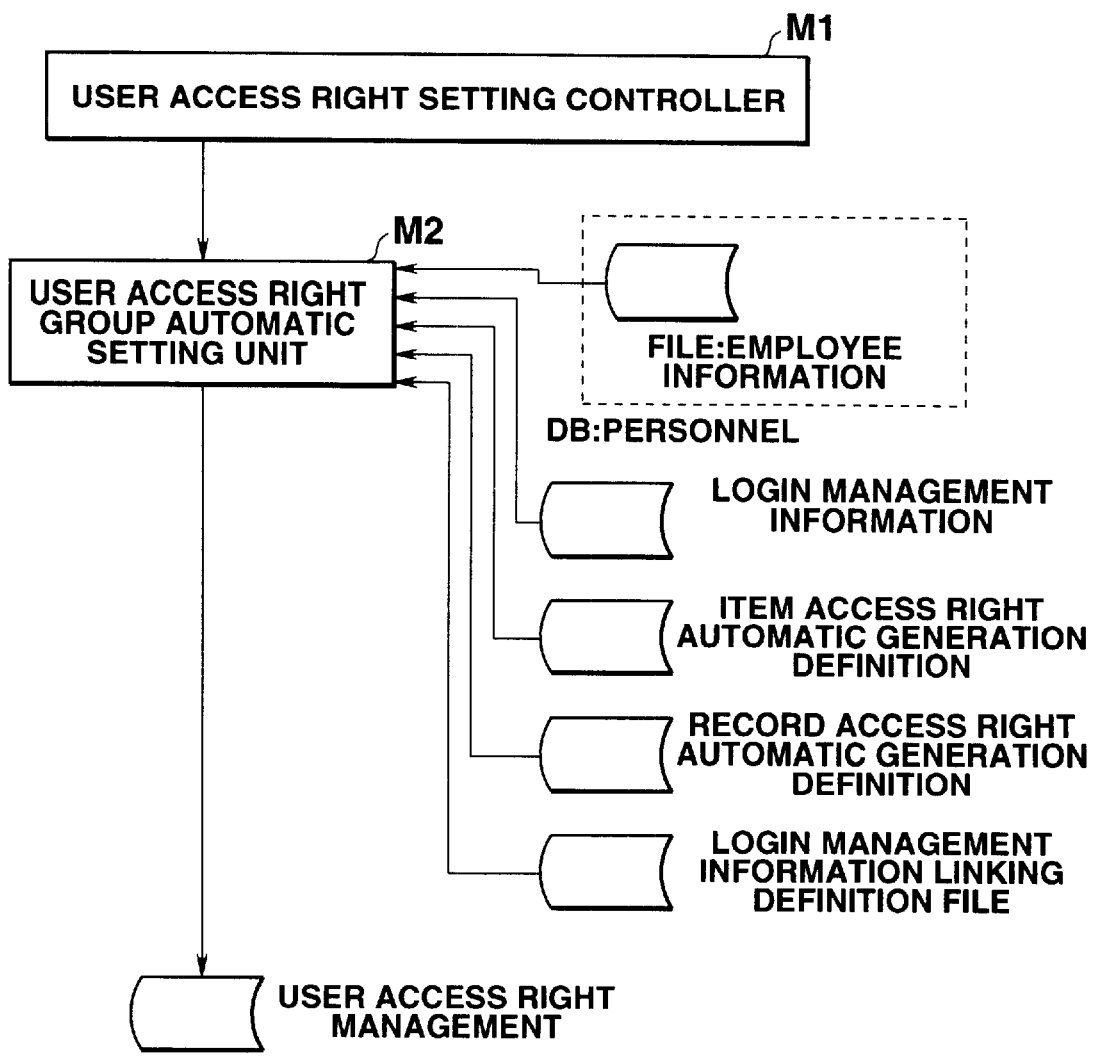
FIG. 7 is a view showing automatic generation of the user access right management file UMF on the basis of the employee information file DB, the item access right automatic generation definition file FGF, the record access right automatic generation definition file RGF, the login management information file LMF, and the login management information linking definition file LLF.

As shown in FIG. 6A, the user access right management file UMF stores and manages "login ID", "item access right group code", and "record access right group code" in units of users. The user access right management file UMF is automatically generated on the basis of the contents of the employee information file (DB), the item access right automatic generation definition file FGF, the record access right automatic generation file RGF, the login management information file LMF, and the login management information linking definition file LLF. FIG. 7 illustrates generation of this user access right management file UMF. When a user access right group automatic setting unit M2 is activated by a user access right setting controller M1, the user access right group automatic setting unit M2 reads out information from the login management information file LMF and the employee information file (DB) on the basis of definition information from the login management information linking definition file LLF, the item access right automatic generation definition file FGF, and the record access right automatic generation definition file RGF to generate the user access right management file UMF. Upon a change in contents of the employee information file (DB), the user access right setting controller M1 activates the user access right group automatic setting unit M2 to update the contents of the user access right management file UMF in accordance with the change in the employee information file (DB), thereby maintaining consistency between the employee information file and the user access right management file UMF. When an arbitrary login ID and password are input in accessing the employee information file, the application execution control refers to the user DB access right file UAF to determine a user group to which the user belongs. At the same time, the application execution control determines on the basis of the access right made to correspond to this user group whether access to an item and record is allowed. The application execution control performs access control based on the above determination. The item access right management file FMF stores and manages an item name permitted for access in units of item access right groups. The record access right management file RMF stores and manages an access condition for each group in accordance with a combination of an item access right and a record access right. The optimization access right management file OPF stores and manages an access right of the contents of the record access right management file RMF, which is optimized under a predetermined condition, in order to improve access efficiency. The user DB access right file UAF stores and manages a user access in accordance with the contents of the user access right management file UMF and the optimization access right management file OPF.

The operation of the data access control apparatus will be described with reference to flow charts in FIGS. 8 to 14. The programs for realizing the functions described in these flow charts are stored in the memory unit 3 in the form of program codes readable by the CPU 1. The contents of the memory unit 3 are loaded in the RAM 2.

Figure 8:
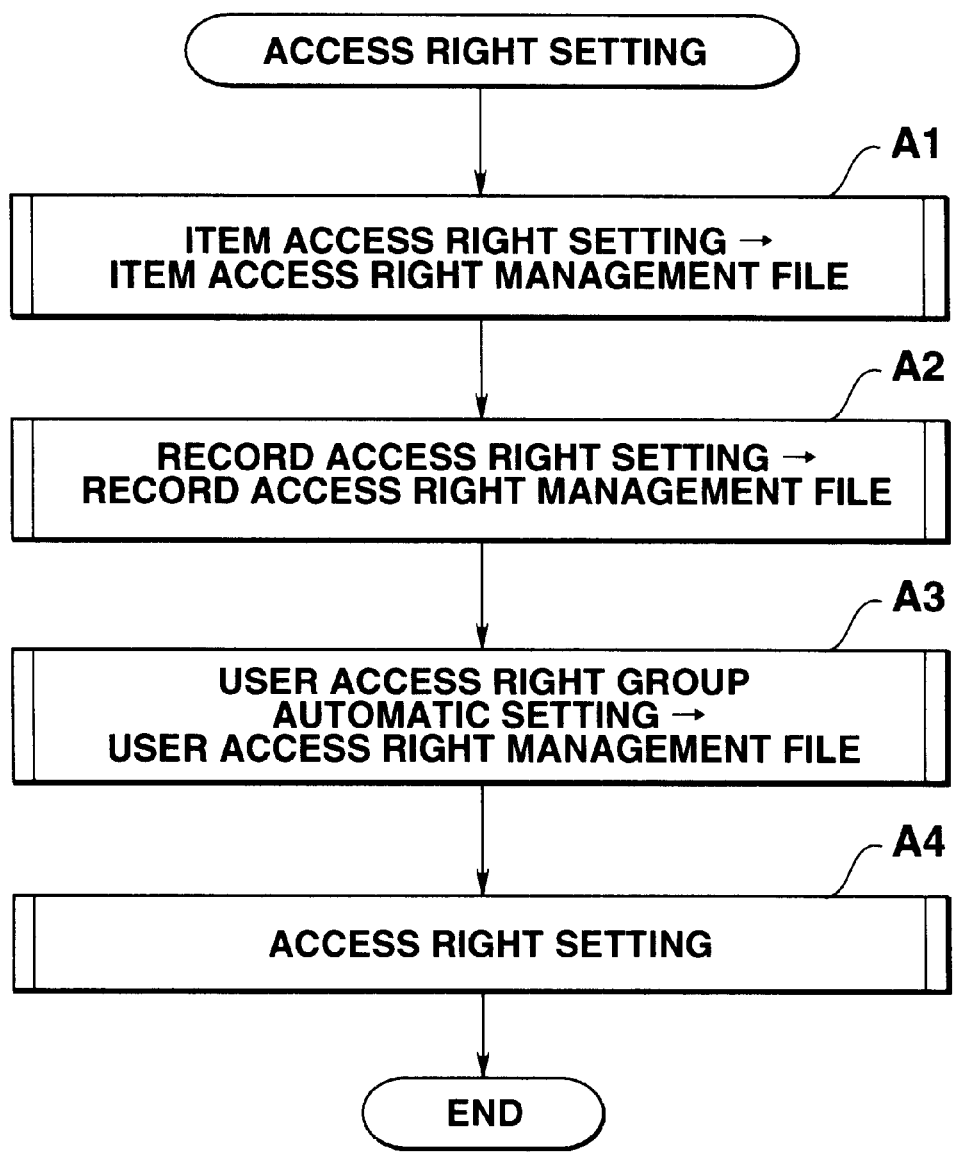
FIG. 8 is a flow chart showing the outline of the overall operation in setting an access right.

FIG. 8 is a flow chart showing the overall operation in setting an access right in the data access control apparatus.

When operation of setting a database access right is started, item access right setting processing is performed in step Al of FIG. 8.

Figure 9:
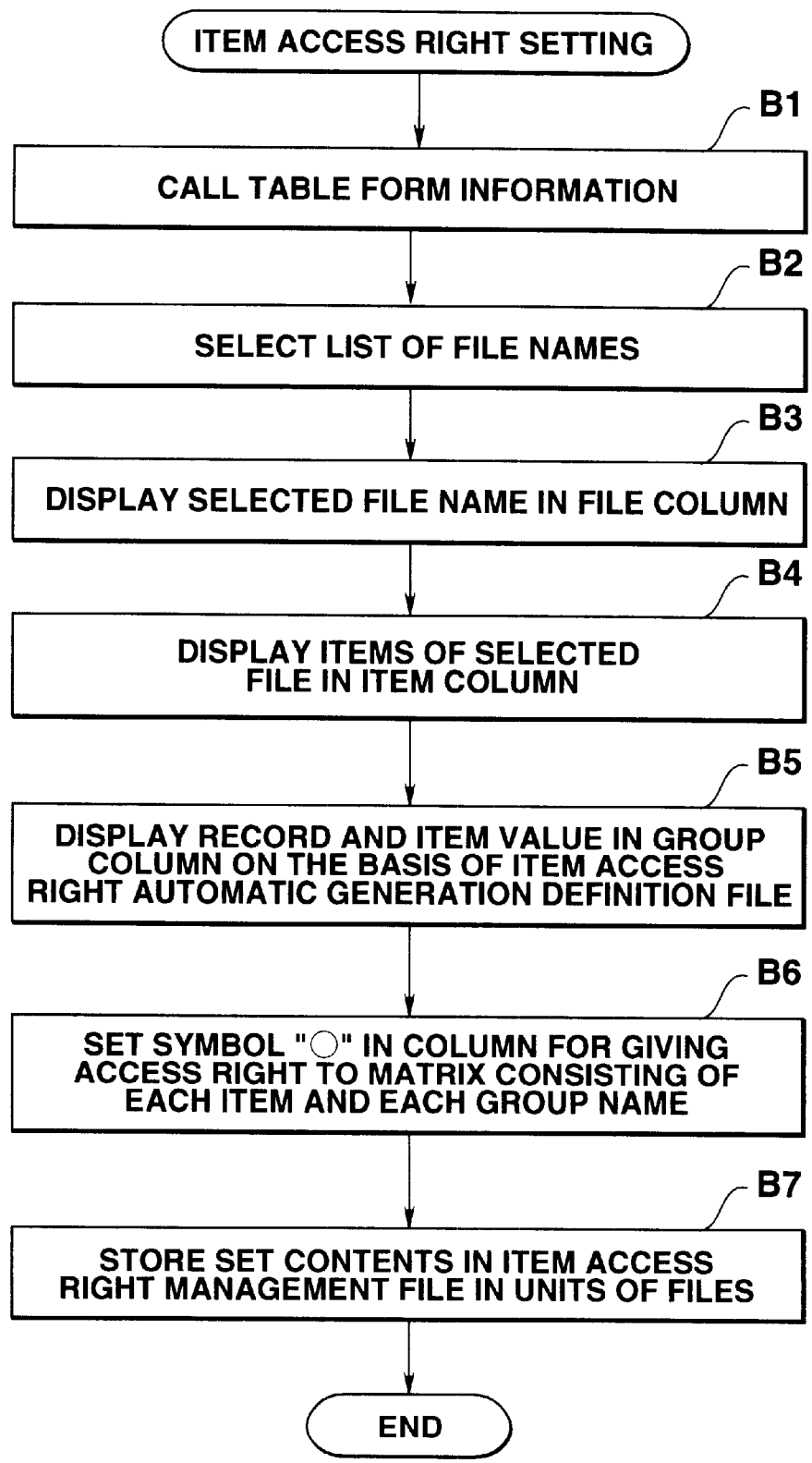
FIG. 9 is a flow chart for explaining step A1 (item access right setting processing) in FIG. 8 in detail.
Figure 15:
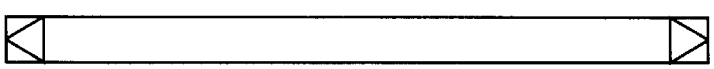
FIG. 15 is a view showing an example in which an item access right is set in a table form.

FIG. 9 is a flow chart showing this setting processing. Predetermined table form information is called from the access right setting table form FM (step B1). As shown in FIG. 15, the table form has a file name column outside the table. Group columns are arranged as the column items in the table, and file data item columns are arranged as row items. A list of file names present in the database is displayed, and the user designates an arbitrary file from the list as an access target. When the file name as the access target is selected (step B2), the selected file name is displayed in the file column (step B3). Assume an employee information file is selected and designated. The file name "employee information" is displayed in the file name column. The names of data items present in the file selected as the access target are displayed in the data item columns in the table together with the table form (step B4). The group codes and their item values which are defined in the item access right automatic generation definition file FGF are read out and displayed in the group columns in the table (step B5). In this case, as shown in FIG. 15, "A, department manager", "B, section manager", "C, personnel 'staff", and "D, regular employee" are classified, arranged, and displayed in the group columns of the table.

As described above, the data item names of the access target file are displayed as the row caption of the table. The codes representing the user groups and the item contents are displayed together with the table form as the column caption of the table. Access right information of each item is input and designated by describing a predetermined symbol in correspondence with each user group at each intersection of the matrix consisting of the row and column captions (step B6). In this case, when item access is permitted or allowed, a circle is written in the intersection area. When item access is inhibited, the intersection area is kept blanked. Symbols are sequentially written in the intersection areas by sequentially updating the row and column points. All information is filled in the table, the set information is transferred to and stored and managed in the item access right management file FMF (step B7).

FIG. 17A shows the data structure of the item access right management file FMF. The data is stored in the form of "FILE"=file name, item access right group code; permitted item name; permitted item name; permitted item name; . . . . When access to all the items is permitted, the permitted item names following the item access right group codes are omitted. When no item access right group code is present, no access right is present in the corresponding file. In this manner, when the item access rights are set in units of user groups, A (department manager) and C (personnel staff) are allowed to access to all the items of the employee information file, while B (section manager) is not allowed to access the items of "reward and punishment" and "application for personnel changes".

B is allowed to access the remaining items. The number of items inhibited to access increases for D (regular employee).

The flow advances to step A2 in FIG. 8 to perform record access right setting processing.

Figure 10:
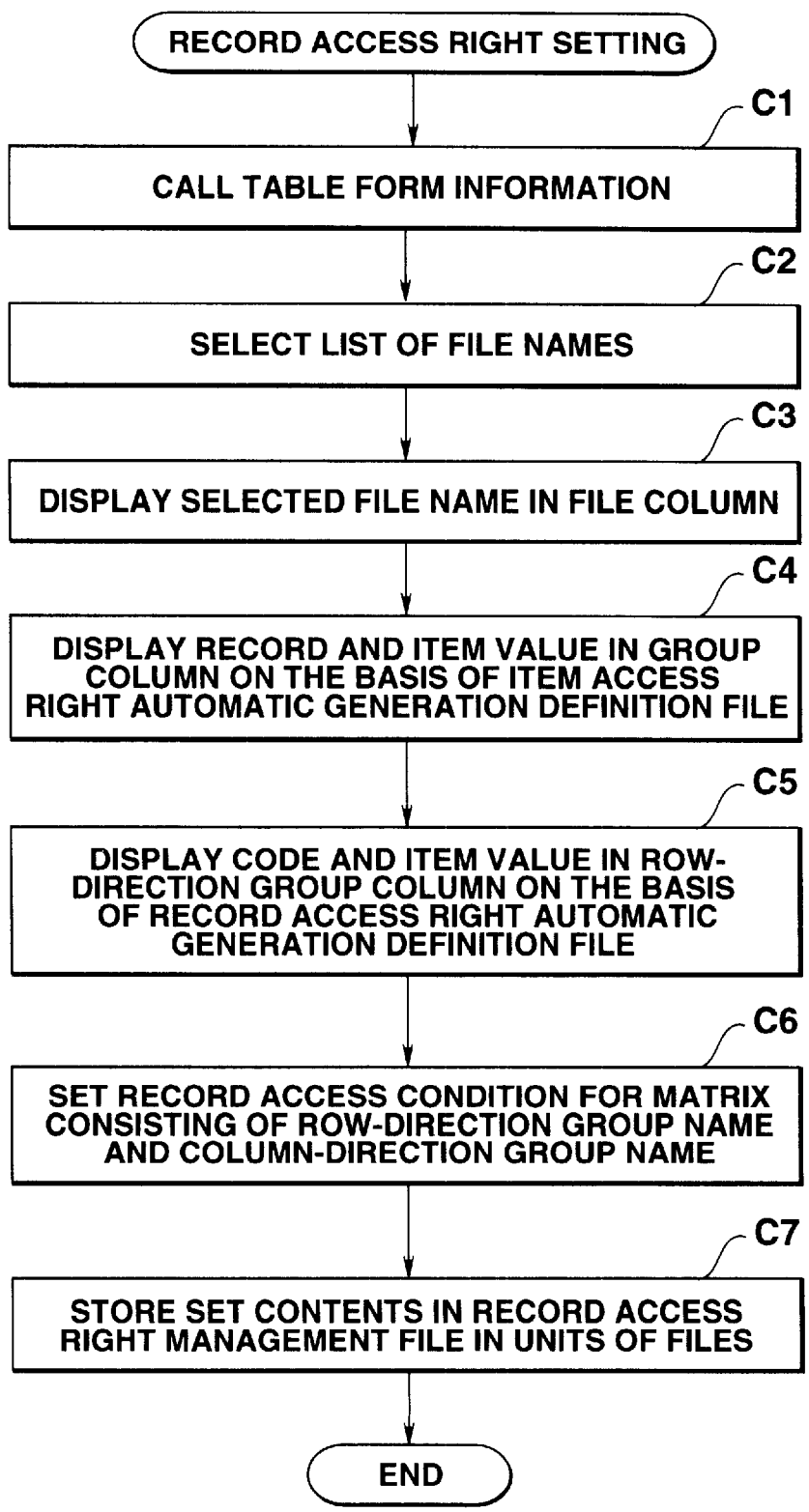
FIG. 10 is a flow chart for explaining step A2 (record access right setting processing) in FIG. 8 in detail.

FIG. 10 is a flow chart showing this setting processing. Predetermined table form information is called from the access right setting table form FM (step C1). In this case, the table form has item access right group columns as the column items in the table, and record access right group columns as the row columns. A list of file names of various files present in the database is displayed, and an arbitrary file is designated from this list as an access target. When the file name is selected (step C2), the selected file name is displayed in the file name column (step C3). The user group codes and item contents which are defined in the item access right automatic generation definition file FGF are read out and displayed in the item access right group columns in the table (step C4).

In this case, as shown in FIG. 16, "A, department manager", . . . , "D, regular employee" are classified, arranged, and displayed in the group columns. The user group codes and item contents which are defined in the record access right automatic generation definition file RGF are read out and displayed in the record access right group columns in the table (step C5). In this case, "1, personnel department", "2, general affairs department", and "3, sales department" are classified, arranged, and displayed in the corresponding group columns, as shown in FIG. 16.

As described above, the item access right group information is displayed as the column caption of the table, while the record access right group information is displayed as the column caption of the table. A record access condition is written at an intersection of a matrix consisting of the row and column captions (step C6). In this case, each intersection area is divided into two parts so as to allow to set two different record access conditions. Each record access condition is described using a logic expression obtained by connecting a data item name to a condition value using a comparison operator (<, ≦, =, ≧, ≠). When a condition value is omitted, the condition value is given by the value unique to the user himself. That is, "department=" indicates that the user belongs to the same department. When a plurality of record access conditions are set in each intersection area, an AND condition is set in this area. For example, an intersection area "C1" (personnel staff, personnel department) having the item access right group code "C" and a record access right group code "1" indicates that the "user belongs to the same office location" but the "user is different from a person to be accessed (different employee No.)". Note that no record access condition is set in a meaningless area such as C2 (personnel staff, general affairs department). Record access conditions are described in intersection areas by sequentially updating the row and column points. When the table is completely filled, the set contents are transferred to and stored and managed in the record access right management file RMF (step C7).

FIG. 17B shows the data structure of the record access right management file RMF. Table setting information in FIG. 16 is stored and managed in the data format shown in FIG. 17B. In this case, the data format is FILE=file name, access right code; condition item name: condition; condition item name: condition; . . . . Note that the access right code is a combination of an item access right group code and a code access right group code.

The flow advances to step A3 in FIG. 8 to perform user access right automatic setting processing.

Figure 11:
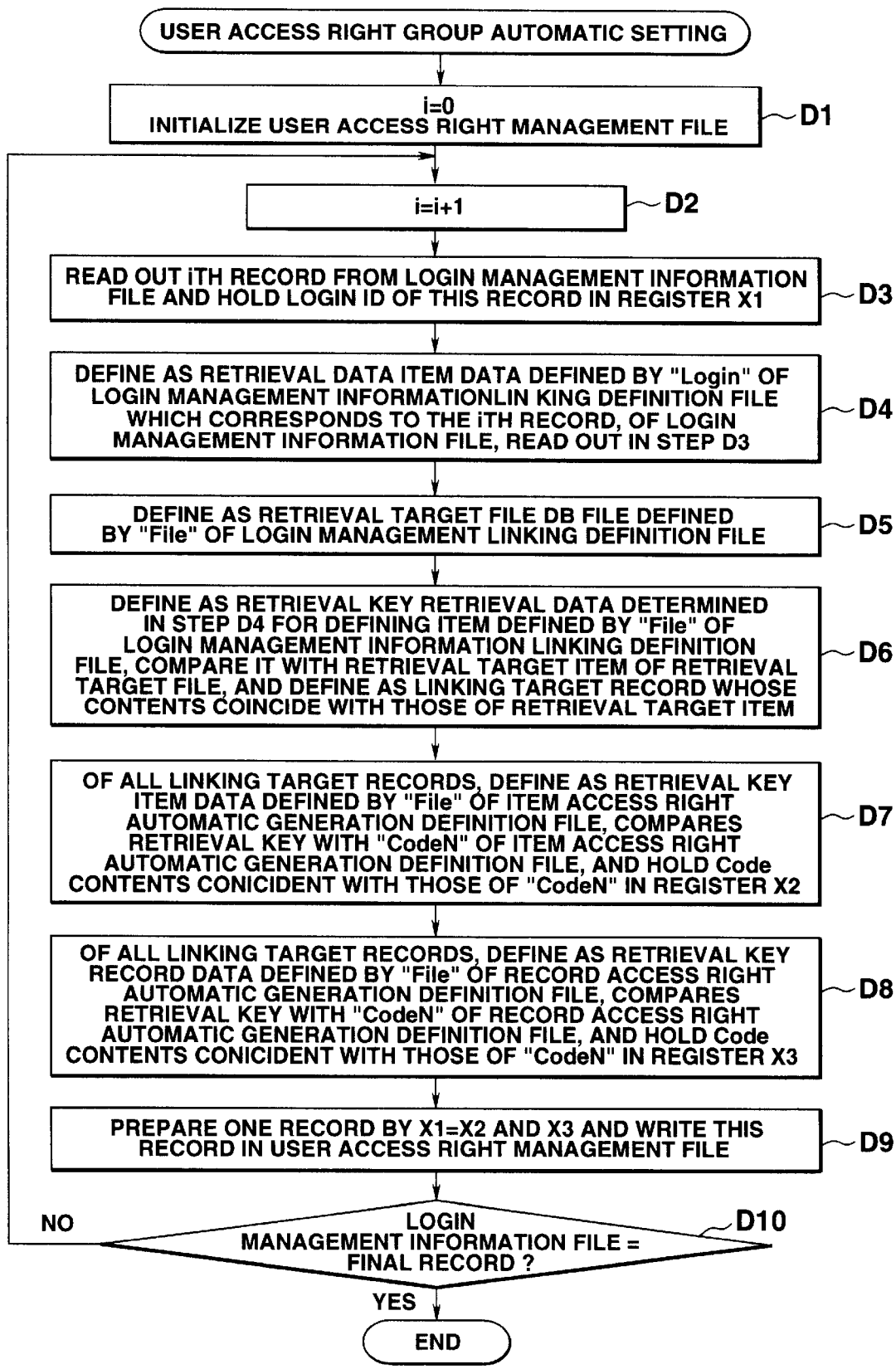
FIG. 11 is a flow chart for explaining step A3 (user access right group automatic setting processing) in FIG. 8 in detail.

FIG. 11 is a flow chart showing this automatic setting processing.

The following initialization is performed. An i register for accessing the login management information file LMF is cleared, and at the same time, all the contents of the user access right management file UMF are cleared (step D1). "1" is added to the i register to update its value (step D2). The login management information file LMF is accessed using the value of this i register to read out the ith record. The "login ID" is extracted from the ith record to set it in a register X1 (step D3). In this case, in the example shown in FIG. 4, the login ID "tuzaki" of the first record is set in the register X1. The value of the item name "user No." defined in "Login" of the login management information linking definition file LLF is defined as retrieval data in place of the login ID of the first record (step D4). The database file "employee information file DB" is specified as a retrieval target file on the basis of the DB name "employee information, personnel" and the file name defined in "File" of the login management information linking definition file LLF (step D5). The corresponding file is retrieved using as the database file retrieval target item the item name "employee No." defined in "Field" of the login management information linking definition file LLF and as a retrieval key the retrieval data specified in step D4, thereby defining the retrieved record as a linking target (step D6). That is, in the examples of FIGS. 3A1 to 3C2 and 4, "user No.=102651" is compared with the employee No. of the employee information file, and the record of tuzaki ○○ represented by employee No.=10265 as the linking target.

Of all the items constituting the record of the linking target, the contents of an item of the item name "post" defined in "Field" of the item access right automatic generation definition file FGF is taken into consideration. When this coincides with one of the item contents "department manager", "section manager", . . . defined in "CodeN" of the item access right automatic generation definition file FGF, the coincident user group code is set in a register X2 (step D7). In this case, in the record of tuzaki ○○, his post is the department manager, and "A" is set as the user group code in the register X2. Of all the items constituting the linking target record, the content of the item name "department" defined in "Field" of the record access right automatic generation definition file RGF is taken into consideration. When this coincides with one of the item contents, i.e., "personnel department", "general affairs department", . . . , the coincident user group code is set in a register X3 (step D8). In this case, in the record of tuzaki ○○, his department is the personnel department, and "1" is set as the user group code in the register X3. The data in the registers X1, X2, and X3 are combined to prepare a record having a data structure of X1=X2X3. This record is written in the user access right management file UMF (step D9). In this case, the record of tuzaki=A1 is written as the start record of the user access right management file UMF (see FIG. 6A). The user name is represented by the login ID, and the access right group is the combination of the item access right group code and the record access right group code. In this case, "tuzaki" has an access right such that his item access right group is the department manager, and his record access right group is the personnel department. To repeat the above operation up to the final record of the login management information file LMF, the flow returns to step D2 until it is detected that the current record exceeds the final record in step D10.

When settings in the item access right management file FMF, the record access right management file RMF, and the user access right management file UMF. are complete, the flow advances to step A4 in FIG. 8 to perform access right setting processing.

Figure 12:
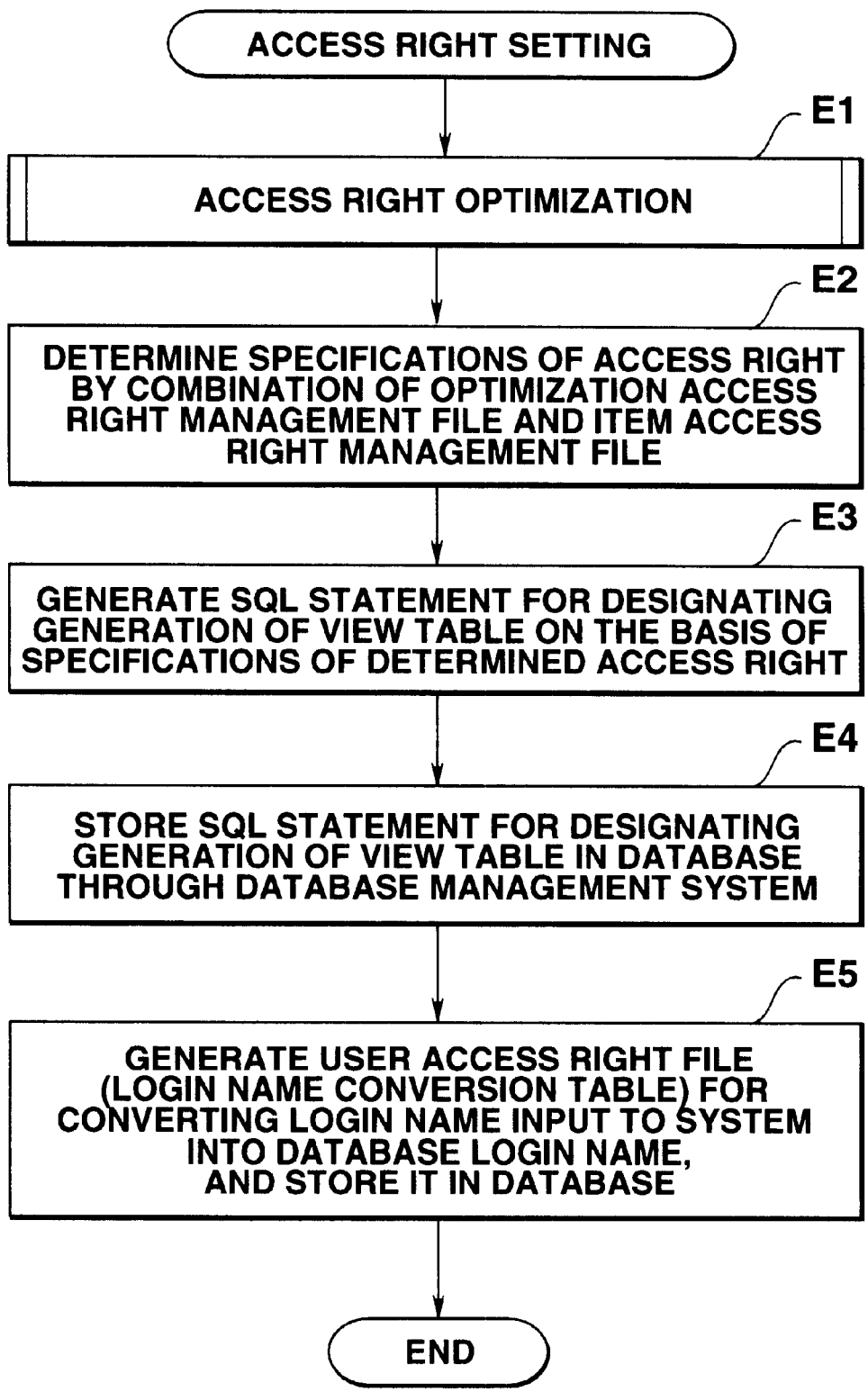
FIG. 12 is a flow chart for explaining step A4 (access right setting processing) in FIG. 8 in detail.
Figure 13:
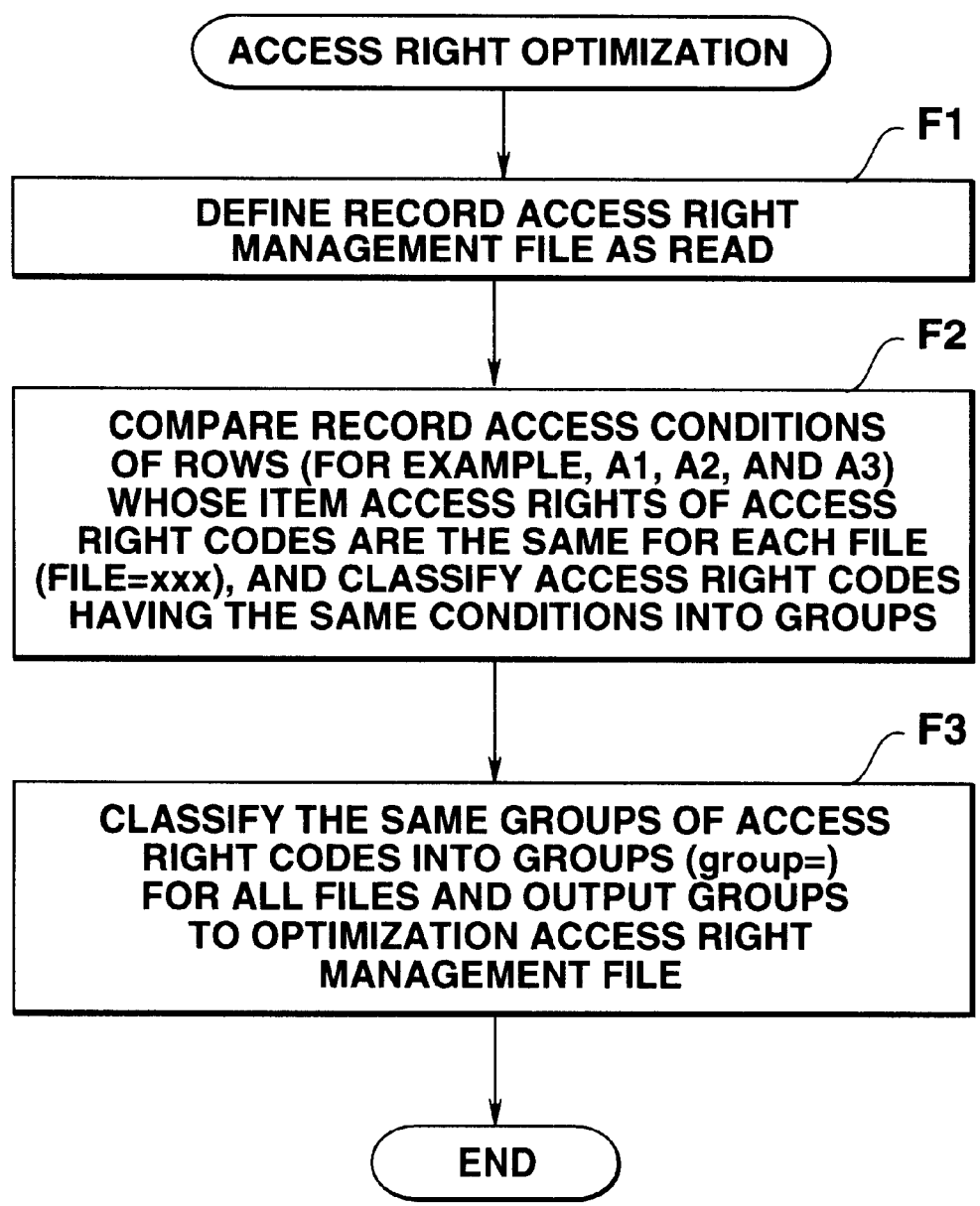
FIG. 13 is a flow chart for explaining step E1 (access right optimization processing) in FIG. 12 in detail.

FIG. 12 is a flow chart showing this setting processing. Access optimization processing is performed first (step E1). This optimization processing is performed in accordance with a flow chart in FIG. 13. More specifically, the contents of the record access right management file RMF are read out (step F1). Record access conditions of rows whose item access rights of the access right codes of files are the same are compared with each other. Access right codes having the same condition are classified as a group (step F2). The access right codes set in the record access right management files RMF are combinations of item access rights and record access rights, such as A1, B1, A2, . . . . For example, record access conditions made to correspond to the access right codes of the rows having the same item access right; such as A1, A2, and A3 are compared with each other. As shown in FIG. 16, the conditions of codes A2 and A3 are the same, i.e., "department=", and the conditions of codes B2 and B3 are the same, i.e., "section=". Access right codes A2 and A3 or access right codes B2 and B3 are classified into the same group. The access right codes of all the files which belong to the same groups are set into a group "group=". The group is transferred to the optimization access right management file OPF (step F3).

FIG. 18B shows the data structure of the optimization access right management file OPF. The contents of the record access right management file RMF shown in FIG. 17B are optimized and recorded and managed in a data format shown in FIG. 18B. In this case, the data format is group=group name: access right group code; access right group code; file name: condition item name; condition: condition item name: condition, . . . . This group name is added to the group obtained in access right optimization processing and is represented by A-1, A-2, B-1, B-2, . . . . In FIG. 18B, "employees X X" represents a file name different from the employee information file.

When this access right optimization processing is complete, the flow advances to step E2 in FIG. 12 to determine the specifications of the access right in accordance with a combination of the optimization access right management file OPF and the item access right management file FMF. The specifications here means how the view and schema on the relational database management system RDBMS side are set. That is, the schema is an optimal group name (e.g., A-1 or B-1), and the group and schema are defined in a 1 1 correspondence. An item access right defined in the item access right management file FMF and a view for managing an access right in units of files in accordance with a record access right defined in the optimization access right management file OPF are defined in each schema. A synonym is defined for a file given all authorities.

A SQL statement for designating generation of a VIEW table for the relational database management system RDBMS is prepared on the basis of the access right specifications determined as described above (step E3). The automatically prepared SQL statement is set in the database DB through the relational database management system RDBMS (step E4). The user DB access right file UAF is prepared on the basis of the contents of the optimization access right management file OPF and the user access right management file UNF (step E5). That is, the user DB access right file UAF used to convert the login name input in data access into the login name (optimized group name) of the database DB is prepared on the basis of the contents of the optimal access right management OPF and the user access right management file UMF. The prepared user DB access right file UAF is set in the database DB. FIG. 18A shows the data structure of the user access right management file UMF, and FIG. 18C shows the data structure of the user DB access right file UAF.

Figure 14:
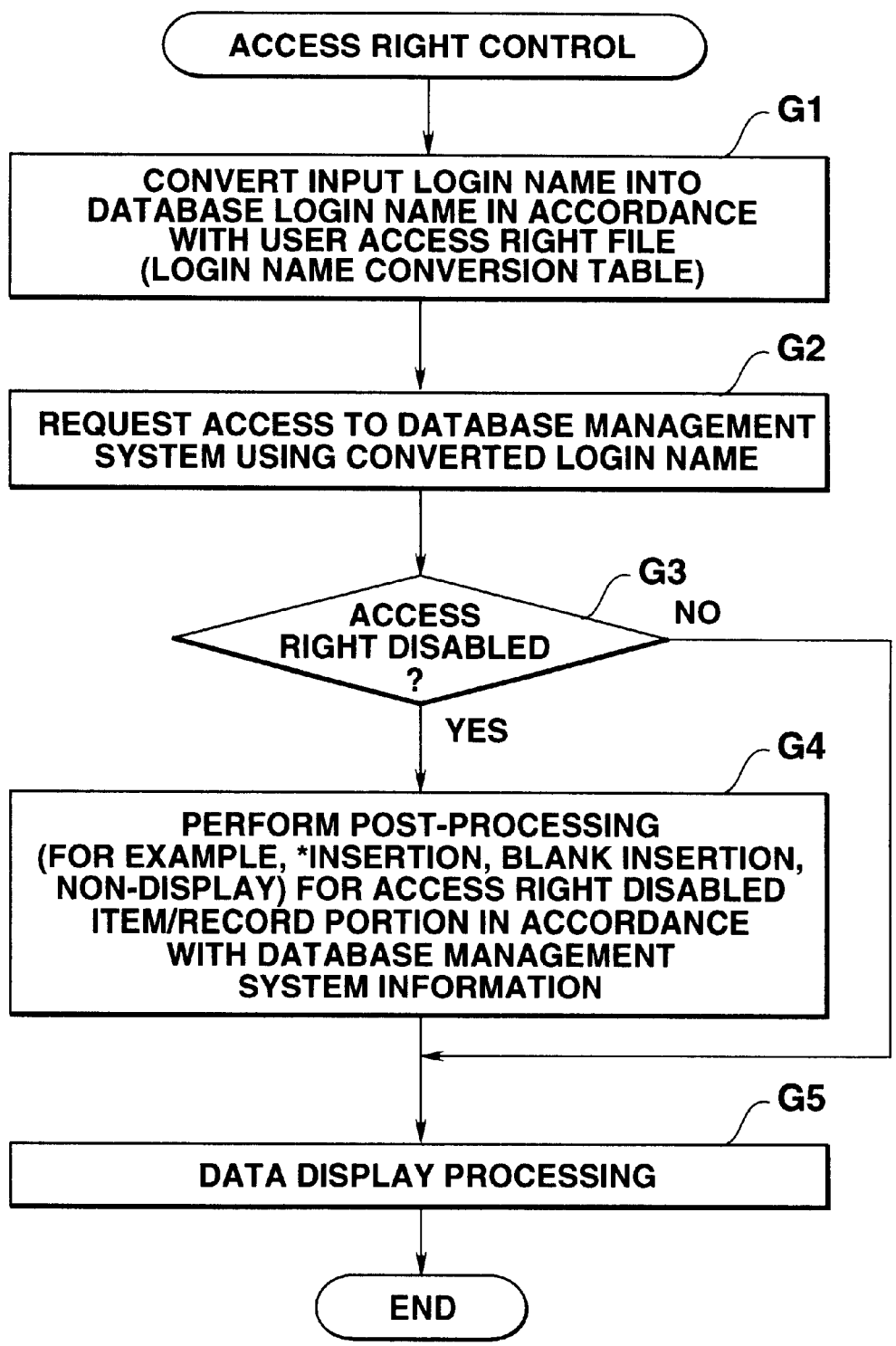
FIG. 14 is a flow chart showing access right control processing.

As described above, operation of accessing the database DB in accordance with the set contents of the access right upon completion of access right setting as described above will be described with reference to a flow chart in FIG. 14.

When the login name of a user who requested an access is input to the system, the user DB access right file UAF is retrieved on the basis of the input login name. The input login name is converted into the login name of the employee information file DB (step G1). For example, when "tuzaki" is input, this login name is converted into "A-1". Access processing is requested to the relational database management system RDBMS using the converted login name (step G2).

On the relational database management system RDBMS side, the SQL statement from the application program AP is analyzed, and a VIEW table is generated, stored, and managed. Upon receiving the access request, the VIEW table of this login name is analyzed to designate an access target file. At the same time, items and records permitted to be accessed are retrieved, and the retrieval result is output. In this case, information of items and records not permitted to be accessed is transmitted to the host application execution control.

When the access disabled state is detected from the relational database management system RDBMS (step G3), post-processing such as *insertion, blank insertion, and non-display is performed by application execution control for the items and records which are set in access disabled state (step G4). The flow advances to data display processing (step G5) No access disabled state is detected, the flow directly advances to data display processing (step G5).

The retrieval operation has been exemplified. In write processing, RDBMS and application execution control perform appropriate processing for a request for processing the items and records which are set in the access disabled state.

The contents of the employee information file (FIG. 5) accessible by the user as a regular employee are shown in FIG. 19. The case in FIG. 19 indicates that a record access right is not set, but only an item access right is set. That is, assume that whether item access is permitted is described in correspondence with the item access right group (regular employee) in units of data items of the employee information file, as shown in FIG. 15. In this case, access to the data items "qualification", "efficiency rating", "salary", "age", "reward and punishment", and "application for personnel changes" is inhibited due to confidentiality. The corresponding item areas are displayed while being embedded with asterisks. For example, the contents of the employee information file to which the general affairs department manager can access are shown in FIG. 20. Assume that retrieval condition items and their condition values are described in the table of FIG. 16 in correspondence with the item access right group (department manager) and the record access right group (general affairs department). In this case, only the records of the department to which the user belongs are accessed and displayed in a list, but records belonging to other departments are not displayed. The department manager is allowed to access all the items. For example, the contents of the employee information file which can be accessed by a regular employee in the general affairs department are shown in FIG. 21. The retrieval condition items and their condition values described in correspondence with the item access right group (regular employee) and the record access right group (general affairs department) are shown as "section=", and "post≦", as shown in FIG. 16. Whether the data items and records are permitted to access is set in accordance with the AND condition of the above items. Therefore, the record of a person whose post is lower than the user and who belongs to the same section as the user can be accessed. The item areas whose access is disabled are embedded with asterisks.

As described above, according to the data access control apparatus, information from the login management information file LMF and the employee information file DB is read out on the basis of the definition information from the login management information linking definition file LLF, the item access right automatic generation definition file FGF, and the record access right automatic generation definition file RGF to automatic set the user access right management file UMF. The contents of the user access right management file UMF need not be input and set for each user. That is, when an operator wants to set the contents of the user access right management file UMF in accordance with the contents of the employee information file DB containing information of a large number of users, it takes a long period of time to input information. At the same time, the input depends on the power of attention of the operator, and input errors readily occur. However, since the user access right management file UMF is automatically set, the load on the operator can be reduced, and reliable settings are achieved. In addition, the consistency between the employee information file DB and the user access right management file UMF can be assured. When the contents of the employee information file DB is changed, the set contents of the user access right management file UMF can automatically change.

In setting an access right in accordance with a user attribute, a description based on settings using the database language can be omitted, and a general business operator having no special knowledge can easily set and change the access right. At the same time, an access right is not described in an application itself, and access right information separately managed is analyzed to perform access right control. Therefore, security can be maintained even in an open environment.

In the embodiment described above, as shown in FIG. 6A, an item access right group code is combined with a record access right group code in correspondence with a login ID. However, only an item access right group code, as shown in FIG. 6B, or only a record access right group code, as shown in FIG. 6C, may be set in a user access right management file UMF.

If access right setting control such as a read, write, record insertion, and record delete is allowed, finer access right control can be performed. The above embodiment employs the relational database management system RDBMS, the degree of freedom in access right control can be expanded under the control of an upper DB application layer (bB use application).

The present invention allows to set and control an access right for linking a plurality of files present in a database. In addition, an access right can be set and controlled by selecting one or a plurality of files in the database. The target range of setting access rights can be greatly enlarged.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data access control apparatus for limiting access to data on the basis of a user attribute in accessing the data in a database having a plurality of records each constituted by a plurality of data items comprising:

user information storage means for storing at least a data item representing identification information unique to a user and a data item representing a user attribute in correspondence with a plurality of users;

definition means for defining a user group corresponding to contents of the data item representing the user attribute;

generation means for generating user group information representing that a user group is made to correspond to each user;

access right information storage means for storing access right information in correspondence with the user group, the access right information representing whether access to the data in the database is allowed; and access control means for, when an arbitrary user is designated in accessing the database, determining a user group, to which the arbitrary user belongs, with reference to the user group information generated by said generation means, and determining on the basis of the access right information made to correspond to the determined user group whether access to the data in the database is allowed.

2. An apparatus according to claim 1, wherein said definition means defines a user group corresponding to a user post.

3. An apparatus according to claim 1, wherein said definition means defines a user group corresponding to a department to which a user belongs.

4. An apparatus according to claim 1, wherein said access right information storage means stores item access right information representing an access enabled/disabled state of data for each item constituting the data.

5. An apparatus according to claim 4, wherein said access right information storage means comprises item access right setting means for arbitrarily setting item access right information representing an access enabled/disabled state of data for each item constituting the data in correspondence with each user group.

6. An apparatus according to claim 1, wherein said access right information storage means stores record access right information representing an access enabled/disabled state of data for each record constituting the data in correspondence with each user group.

7. An apparatus according to claim 6, wherein said access right information storage means comprises record access right setting means for arbitrarily setting record access right information representing an access enabled/disabled state of data for each record constituting the data in correspondence with each user group.

8. An apparatus according to claim 1, wherein said access right information storage means stores, in correspondence with each user group, item access right information representing an access enabled/disabled state of data for each item constituting the data and record access right information representing an access enabled/disabled state of data for each record constituting the data.

9. An apparatus according to claim 8, wherein said access right information storage means comprises access right setting means for arbitrarily setting item access right information representing an access enabled/disabled state for each item constituting the data in correspondence with each user group and record access right information representing an access enabled/disabled state of the data for each record constituting the data in correspondence with each user group.

10. An apparatus according to claim 1, wherein said generation means generates user group information which makes a user group correspond to each user when a data item representing a user attribute and stored in said user information storage means is changed.

11. An apparatus according to claim 1, further comprising language generation means for generating a predetermined database language for analyzing access right information corresponding to the user group to access the database.

12. A recording medium which records a program for causing a computer to realize a predetermined function, comprising:

a program for realizing a function of referring to user information storing at least a data item representing identification information unique to a user and a data item representing a user attribute in correspondence with a plurality of users, and definition information defining a user group corresponding to contents of the data item representing the user attribute, and of generating user group information made to correspond to the user group in units of users; and a program for realizing a function of, when an arbitrary user is designated in accessing a database, referring to the user group information to determine a user group to which the arbitrary user belongs, and determining an access enabled/disabled state of data in the database on the basis of the access right information representing the access enabled/disabled state of the data in the database and made to correspond to the determined user group.

13. A data access control apparatus for limiting access to data on the basis of a user attribute in accessing the data in a database having a plurality of records each constituted by a plurality of data items comprising:

user information storage means for storing at least a data item representing identification information unique to a user and a data item representing a user attribute in correspondence with a plurality of users;

first definition means for defining a user group corresponding to contents of the data item representing the user attribute;

second definition means for defining a relationship between the identification information unique to the user and login information input and designated in accessing data in the database;

generation means for generating user group information which makes the login information correspond to the user group in units of users;

access right information storage means for storing access right information representing an access enabled/disabled state of data in the database in correspondence with a user group; and access control means for, when arbitrary login information is input in accessing the database, referring to user group information generated by said generation means to determine a user group to which the user belongs, and determining the access enabled/disabled state of the data in the database on the basis of the access right information made to correspond to the determined user group.

14. An apparatus according to claim 13, wherein said first definition means defines a user group corresponding to a user post.

15. An apparatus according to claim 13, wherein said first definition means defines a user group corresponding to a department to which a user belongs.

16. An apparatus according to claim 13, wherein said access right information storage means stores item access right information representing an access enabled/disabled state of data for each item constituting the data.

17. An apparatus according to claim 16, wherein said access right information storage means comprises item access right setting means for arbitrarily setting item access right information representing an access enabled/disabled state of data for each item constituting the data in correspondence with each user group.

18. An apparatus according to claim 13, wherein said access right information storage means stores record access right information representing an access enabled/disabled state of data for each record constituting the data in correspondence with each user group.

19. An apparatus according to claim 18, wherein said access right information storage means comprises record access right setting means for arbitrarily setting record access right information representing an access enabled/disabled state of data for each record constituting the data in correspondence with each user group.

20. An apparatus according to claim 13, wherein said access right information storage means stores, in correspondence with each user group, item access right information representing an access enabled/disabled state of data for each item constituting the data and record access right information representing an access enabled/disabled state of data for each record constituting the data.

21. An apparatus according to claim 20, wherein said access right information storage means comprises access right setting means for arbitrarily setting item access right information representing an access enabled/disabled state for each item constituting the data in correspondence with each user group and record access right information representing an access enabled/disabled state of the data for each record constituting the data in correspondence with each user group.

22. An apparatus according to claim 13, wherein said generation means generates user group information which makes a user group correspond to each user when a data item representing a user attribute is changed.

23. An apparatus according to claim 13, further comprising language generation means for generating a predetermined database language for analyzing access right information corresponding to the user group to access the database.

24. A recording medium which records a program for causing a computer to realize a predetermined function, comprising:

a program for realizing a function of referring to user information storing at least a data item representing identification information unique to a user and a data item representing a user attribute in correspondence with a plurality of users, definition information defining a user group corresponding to contents of the data item representing the user attribute, and definition information defining a relationship between the identification information. unique to the user and login information input and designated in accessing data in the database and of generating user group information which makes the login information correspond to the user group in units of users; and a program for realizing a function of, when arbitrary login information is designated in accessing a database, referring to the user group information to determine a user group to which the user belongs, and determining an access enabled/disabled state of data in the database on the basis of the access right information representing the access enabled/disabled state of the data in the database and made to correspond to the determined user group and the user access right information stored in correspondence with the determined user group.

* * * * *